April 16, 1963
M. SHULMAN
3,085,337
DENTAL IMPRESSION DEVICE
Filed Jan. 8, 1960
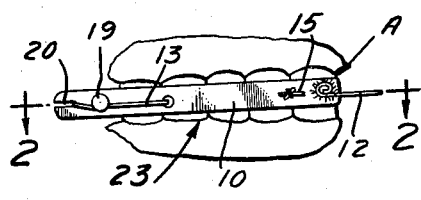
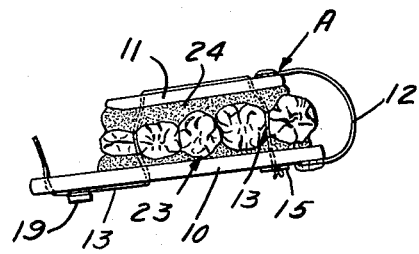
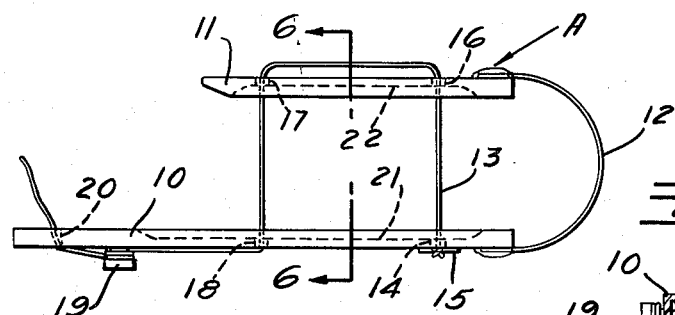
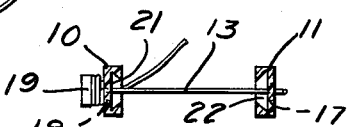
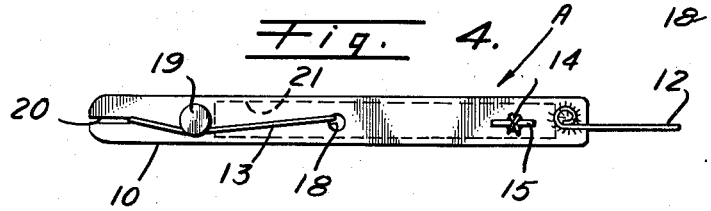
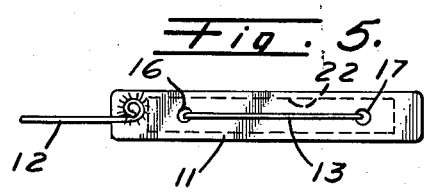
MELVIN SHULMAN,
INVENTOR.
WHANN & McMANIGAL
Attorneys for Applicant
by Robert H. McManigal

United States Patent Office 3,085,337
Patented Apr. 16, 1963

3,085,337
DENTAL IMPRESSION DEVICE
Melvin Shulman, 5002 Matilija, Sherman Oaks, Calif.
Filed Jan. 8, 1960, Ser. No. 1,305
5 Claims. (Cl. 32—19)

The present invention relates generally to the field of operative and crown and bridge dentistry, and is more particularly concerned with a method and means for orienting dental sectional models on an articulator.

At the present time it is conventional procedure to prepare sectional models from impressions of upper and lower teeth by means of an impression tray which is filled with a hydrocolloid or other settable medium or by a wax bite procedure. By such procedures, the impressions include the occlusal surfaces of the teeth, and must of necessity require an open bite, rather than a closed bite.

The problem then arises as to properly orienting the sectional models on the articulator, and heretofore, there has been no means which would assure that the sectional models are relatively oriented so as to provide the normal closed bite contact of the occlusal surfaces.

In order to overcome the inherent disadvantages of the conventional procedures as outlined above, and permit a precision orientation of the models so as to assure that normal closed bite contact will be established between the occlusal surfaces prior to the sections being secured on an articulator, the present invention in its broad concept proposes to utilize novel means and method procedure whereby the operatively associated sections may be oriented with a high degree of precision and perfection.

It is one object of the invention to provide a simple, inexpensive device which is easy to operate, and which will efficiently orient the sectional models.

A further object is to provide a dental device of disposable character which may be utilized to obtain closed bite impressions of the buccal and lingual sides of the teeth of the patient which are to be reproduced in the sectional models, these impressions as so obtained being subsequently utilized to orient the sectional models prior to their being permanently secured on the articulator.

Still another object is to provide a new method in prosthetic dentistry for orienting upper and lower sectional models so that the occlusal surfaces of the associated teeth will make normal bite contact.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a fragmentary elevational view illustrating the use of the present invention when taking lateral side impressions of the teeth in a patient's mouth, and/or when orienting the sectional models on the articulator;

FIG. 2 is a transverse section, taken substantially on line 2—2 of FIG. 1 between the occlusal contact surfaces of the upper and lower teeth;

FIG. 3 is a plan view of my improved device;

FIG. 4 is an elevational view of the buccal splint of the device;

FIG. 5 is an elevational view of the lingual splint of the device; and

FIG. 6 is a transverse sectional view taken through the device substantially on line 6—6 of FIG. 3.

Referring more specifically to the drawings for illustrative purposes the device of the present invention is illustrated in FIGS. 1 and 2 in its operative position, which may be either in connection with the patient's teeth at the time of taking an impression, or it may be the position of the device as subsequently used to orient the section models prior to permanent securement on the articulator. In its broad concept, the device comprises an articulated assembly as generally indicated at A and as best shown in FIG. 3 as including a buccal splint 10 and a lingual splint 11. These splints are constructed of any appropriate material, many currently available plastics being admirably adapted for the purpose.

The splints 10 and 11 are assembled into an articulated unit in which the splints 10 and 11 are interconnected at one set of their adjacent ends by means of a deformable U-shaped connector 12 of wire or other suitable material. With this arrangement, the splints 10 and 11 are relatively positioned in substantially parallel relation, but may be moved towards and away from each other. The ends of the U-shaped connector 12 are respectively anchored to the splints in any suitable manner. For example, the ends of the U-shaped connector may be bonded to the splint end by an adhesive, or may be inserted into the end of the splint, or otherwise.

Means are provided for moving the splints towards each other, and once the splints are in a desired position, held against separating movement from such position. This may be accomplished by various arrangements. The arrangement which I have disclosed and which works very successfully comprises a tension member in the form of a filamentary medium such as dental floss or other appropriate material, as indicated by the numeral 13, one end of the member 13 extends through a transverse opening 14 at the end of the splint 10 which is connected to the U-shaped connector, and is attached to a short pin 15. From the opening 14, the member 13 extends directly across and through an opening 16 in the similarly positioned end of splint 11. The tension member is then carried along the outside of the splint 11 where it passes through an opening 17 and thence across to an opening 18 in the splint 10. The running end of the tension member may be releasably secured by winding a few turns around a small cleat or projection 19, and then holding the end of the tension member by instering it into an open ended slit 20 formed in the adjacent end of the splint 10. The confronting faces of the splints 10 and 11 are provided with longitudinally extending grooves 21 and 22 having undercut sides to permit the anchoring of an impression material thereon for the taking of impressions on the buccal and lingual sides of the patient's teeth, which are positioned between the splints 10 and 11, as will hereinafter be explained more fully.

Having described the device of the invention, the method and manner of utilizing it will now be described. The device is applied to the section of the patient's tooth structure of which model sections are to be prepared, the elongate splint 10 being positioned on the buccal or cheek side of the teeth, with the shorter splint 11 on the lingual side of the teeth, as generally indicated by the numeral 23 in FIGS. 1 and 2. Just prior to placement of the device in the patient's mouth, the splints 10 and 11 are lined on their confronting surfaces with suitable impression material 24, which is readily available for this purpose and well known in the art of dentistry.

As thus positioned, the strands of tension material 13 which pass between the splints may be so positioned that they do not interfere with normal contact between the occlusal surfaces, when the bite is completely closed.

At the time of taking the impressions with the device, the bite should be completely closed, and then by actuating the tension member to press the splints towards each other, the impressions of the teeth will be made in the impression material, and by taking up on the tension member 13 and securing it in position, the splints will be retained against separating movement. A mold is thus in effect obtained with the bite completely closed and in normal position.

The device with the buccal and lingual side impressions therein is then utilized for orienting the model sections on the articulator, the model sections having been prepared in the usual manner. More specifically, the teeth of the upper and lower sections may now be fitted into the impressions formed in the impression material 24. The teeth of the model sections will thus be oriented into their proper closed bite position, and if desired, may be retained in this oriented position by the use of an adhesive gum which may be placed at several points to hold the teeth and impression material against relative movement. As thus assembled, the model sections may be permanently secured to the arms of an articulator by means of plaster of Paris or other material in the conventional manner. By following this procedure, the normal position of the model sections will be assured so that when the bite is completely closed, the occlusal surfaces will make proper normal contact.

From the foregoing description, it is believed that it will be readily apparent that the device of the present invention eliminates the problem of uncertainty which attends the conventional practice and procedure as now utilized, and that the use of the device institutes a new method of procedure having manifestly inherent advantages over the former practice.

Various modifications may suggest themselves to those skilled in the art without departing from the spirit of my invention, and, hence, I do not wish to be restricted to the specific form shown or uses mentioned, except to the extent indicated in the appended claims.

I claim:

1. A dental device for obtaining closed bite impressions of the buccal and lingual sides of teeth, comprising: a pair of elongate confronting splint members linked by a deformable connection normally operating to retain the members in substantially parallel spaced relation, but enable their being moved towards and away from each other; and means adjustable from the buccal side of the device for moving said splint members towards each other, but restraining said splint members in a direction to relatively move them laterally away from each other.

2. A dental device for obtaining closed bite impressions of the buccal and lingual sides of teeth, comprising: a pair of elongate confronting splint members having adjacent ends linked to form an articulate assembly in which the splint members are retained in substantially parallel spaced relation, but are movable towards and away from each other; and adjustable flexible means operable with the teeth in closed bite position for moving said splints towards each other, and in adjusted position restraining said splint members in a direction to relatively move them laterally away from each other.

3. A dental device for obtaining closed bite impressions of the buccal and lingual sides of teeth, comprising: a pair of elongate splint members having spaced openings therein; a deformable member interconnecting adjacently disposed ends of said splint members for normally retaining said members in spaced apart substantially parallel relation with their innermost surfaces confronting, but enabling adjusting movement thereof towards and away from each other; and an adjustable flexible tie member threaded through said openings for moving the splint members towards each other to an adjusted secured position and restraining said splint members against movement from said secured position in a separating direction.

4. A dental device for obtaining closed bite impressions of the buccal and lingual sides of teeth, comprising: a pair of elongate splint members having spaced openings therein; a deformable member interconnecting adjacently disposed ends of said splint members for normally retaining said members in spaced apart substantially parallel relation with their innermost surfaces confronting, but enabling adjusting movement thereof towards and away from each other; an adjustable flexible tie member threaded through said openings, one end of said tie member being anchored to one of said splint members; and means carried by one of said splint members for releasably anchoring the other end of said tie member.

5. A dental device for obtaining closed bite impressions of the buccal and lingual sides of teeth, comprising a pair of elongate splint members having spaced openings therein; a deformable member interconnecting adjacently disposed ends of said splint members for normally retaining said members in spaced apart substantially parallel relation with their innermost surfaces confronting, but enabling adjusting movement thereof towards and away from each other; an adjustable flexible tie member threaded through said openings, one end of said tie member being anchored to one of said splint members; and means carried by one of said splint members for releasably anchoring the other end of said tie member, said means including a projection about which said tie member may be wound, and an open ended slit for laterally receiving a terminus portion of said other end.

References Cited in the file of this patent

UNITED STATES PATENTS

| | | |
|---|---|---|
| 1,200,335 | Foster | Oct. 3, 1916 |
| 1,518,075 | Kesling | Dec. 2, 1924 |

FOREIGN PATENTS

| | | |
|---|---|---|
| 1,035,819 | France | Apr. 22, 1953 |